United States Patent [19]

Suzuki

[11] Patent Number: 4,855,794
[45] Date of Patent: Aug. 8, 1989

[54] COPYING MACHINE WITH AN AUTOMATIC DOCUMENT FEEDER

[75] Inventor: Norihiko Suzuki, Osaka, Japan

[73] Assignee: Minolta Camera Kabushiki Kaisha, Osaka, Japan

[21] Appl. No.: 194,228

[22] Filed: May 16, 1988

[30] Foreign Application Priority Data

May 19, 1987 [JP] Japan .............................. 62-122035

[51] Int. Cl.⁴ .............................................. G03B 27/44
[52] U.S. Cl. .................................... 355/54; 355/244; 355/313; 271/9
[58] Field of Search .................. 355/54, 3 SH, 14 SH; 271/9

[56] References Cited

U.S. PATENT DOCUMENTS 3,844,552 10/1974 Bleau et al. .
4,135,808 1/1979 Morrison .
4,727,401 2/1988 Partilla et al. .
4,731,637 3/1988 Acquaviva et al. .

Primary Examiner—Monroe H. Hayes
Attorney, Agent, or Firm—Burns, Doane, Swecker & Mathis

[57] ABSTRACT

The disclosure relates to a copy machine having a document feeding apparatus. The document feeding apparatus comprises a transport belt which includes a first belt transport portion and a second belt transport portion, both of which can be operable integrally or independently.

When a plurality of copies are required to be formed from two kinds of different documents, i.e., a first document F and a plurality of second documents S, the second belt transport portion for transporting the second documents is operated independently of the first belt transport portion for transporting the first document.

When a plurality of copies are required to be formed from one kind of documents, the first and second belt transport portions are integrally operated.

10 Claims, 10 Drawing Sheets

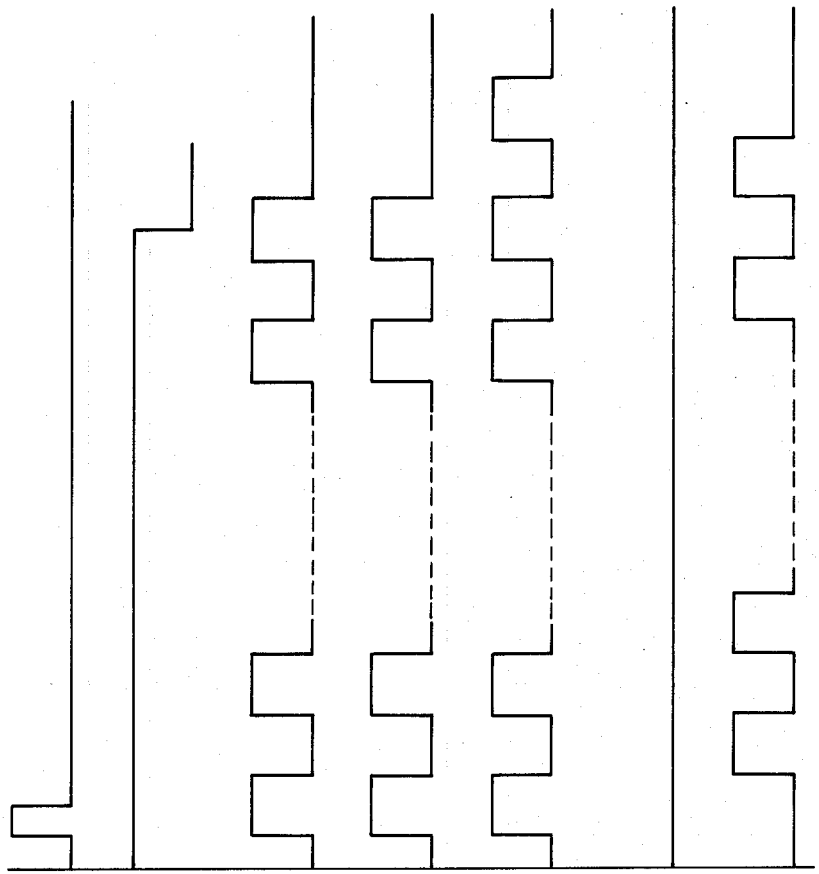

COPYING MACHINE WITH AN AUTOMATIC DOCUMENT FEEDER

BACKGROUND OF THE INVENTION

1. Field of the Invention

The present invention relates to a copying machine with an automatic document feeder, and more particularly to a copying machine with an automatic document feeder capable of placing two original documents simultaneously on a platen of the copying machine and copying the images of said two original documents on a single copy paper.

2. Description of the Prior Arts:

Conventional document feeding apparatuses for use in a copying machine or the like, especially automatic document feeding apparatuses have adopted a method for driving one endless belt or a method for driving integrally endless belts which are divided into two.

In the above-mentioned conventional document feeding method, transporting means for transporting a document by driving an endless belt is always driven integrally. Therefore, in the case where the address and information should be copied on a reply-paid postcard, a user has to first copy either the address or information on the postcard, and then, to supply the copied paper again to the copying machine to copy the remaining information. Therefore, it is very troublesome to perform the editing copy operation in the case where there is a demand to make a plenty of composite copies at one time.

SUMMARY OF THE INVENTION

The main object of the present invention is to provide a copying machine with an automatic document feeder capable of placing two original documents simultaneously on a platen and of discharging said two original documents independently from the platen.

Another object of the invention is to provide a copying machine with an automatic document feeder capable of obtaining a composite copy in one cycle of the copy operation.

These and other objects of the invention can be accomplished by providing a document feeding apparatus wherein a document is fed to a platen of a copying machine and discharged from the platen after exposure, said apparatus comprising document stack means including a first stack portion and a second stack portion, first supply means for feeding a document placed on the first stack portion, first transport means for setting the document fed by the first supply means on a first area of the platen and then discharging the same therefrom after exposure, second supply means for feeding a document placed on the second stack portion, said second supply means being independently operable of the first supply means, and second transport means for setting the document fed by the second supply means on a second area of the platen and then discharging the same therefrom after exposure, said second transport means being independently operable of the first transport means.

These and other objects, advantages and features of the invention will become apparent from the following description thereof taken in conjunction with the accompanying drawings which illustrate a specific embodiment of the invention.

BRIEF DESCRIPTION OF THE DRAWINGS

In the following description, like parts are designated by like reference numbers throughout the several drawings.

FIG. 10 is a time chart in a cooperation mode.

DETAILED DESCRIPTION

A preferred embodiment according to the present invention will be explained hereinbelow with reference to the drawings.

Figure 1:
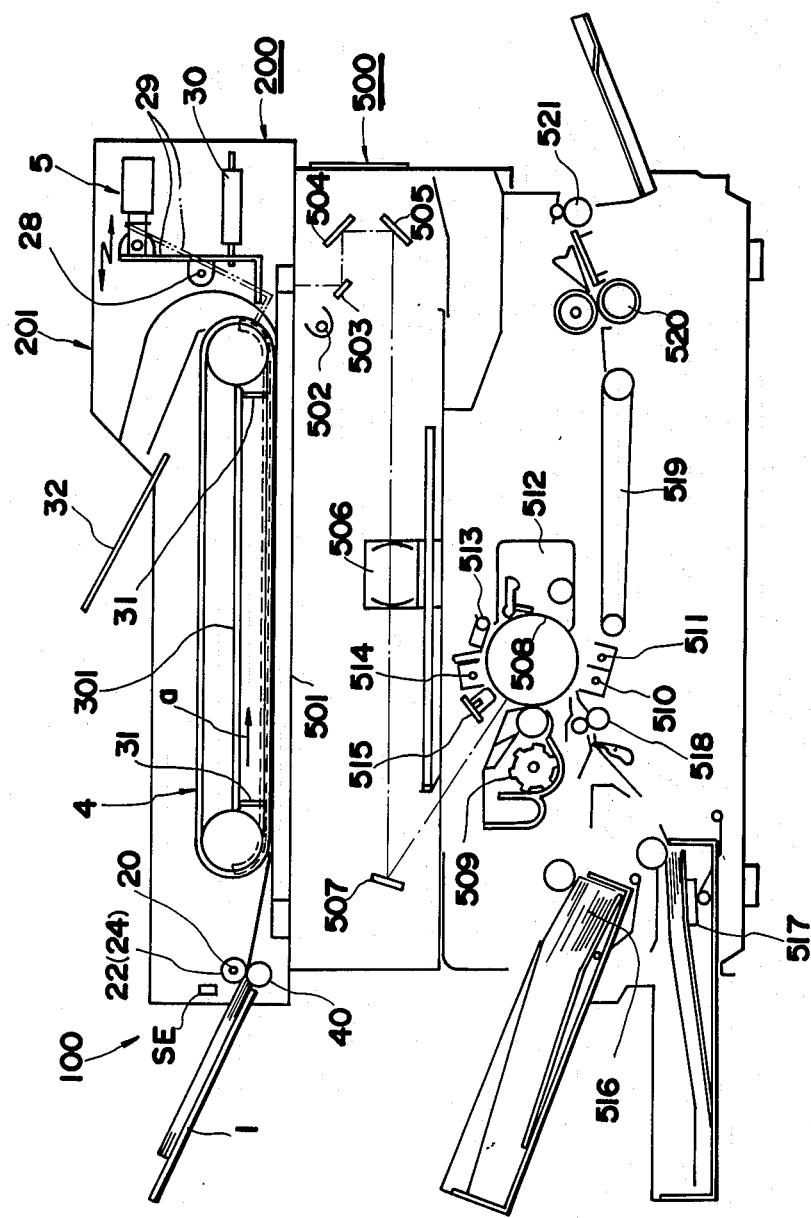
FIG 1 is a sectional view schematically showing the construction of a copying machine employing a document feeding apparatus.

FIG. 1 shows a schematic structure of a copying machine employing a document feeding apparatus. The copying machine comprises a machine main body 500 and a document feeding apparatus 200 provided above the main body.

The machine main body comprises a document support table 501, light source 502 and first, second and third mirrors 503, 504 and 505. The scanning operation is executed by integrally moving the light source 502 and first mirror 503 along the undersurface of the document support table 501. Numeral 506, 507 and 508 denote respectively a throughlens, fourth mirror and a photosensitive member. An image on the document support table 501 is projected on the photosensitive member 508. Arranged around the photosensitive member 508 are a developing device 509, transfer charger 510, separate charger 511, cleaner 512, main eraser 513, charger 514 and inter-image eraser 515. The machine main body further includes paper feed portions 516 and 517, a register roller 518, a transport conveyer 519, a fixing portion 520 and a discharge roller 521.

The document feeding apparatus 200, housed in a housing 201 which is provided so as to be capable of opening and closing relative to the machine main body 500, comprises as a basic structure a document supply means 100, a transport means 4 and a changeover portion 5.

Figure 2:
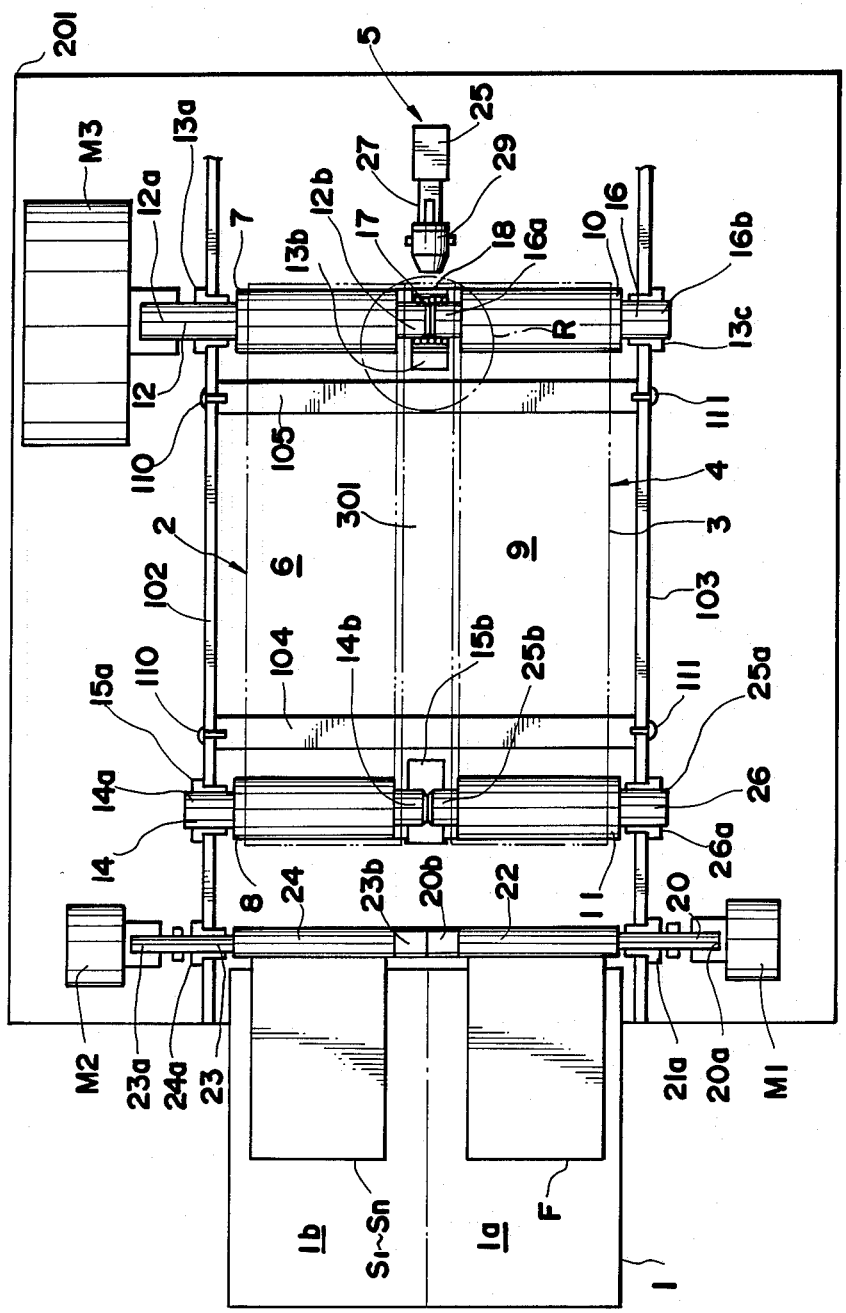
FIG. 2 is a top view showing the document feeding apparatus.

The document supply means 100 includes as shown in FIG. 1 a tray 1 on which a document P is placed, feed rollers 22 and 24 (shown in FIG. 2) and a separation roller 40. As shown in FIG. 2, the tray 1 includes a first document placing area 1a and a second document placing area 1b. The feed roller 22 opposed to the first document placing area 1a is mounted on a rotational driving axis 20. The rotational driving axis 20 has its one end 20a connected to a motor M1 and supported by a frame 103 held in the housing 201 through a bearing 21a and another end 20b supported by a bearing not shown. The feed roller 24 opposed to the second document placing area 1b is mounted on a rotational driving axis 23. The rotational driving axis 23 has its one end 23a connected to a motor M2 and supported by a frame 102 held in the housing 201 through a bearing 24a and another end 23b made in contact with the end 20b of the rotational driving axis 20 and supported by a bearing not shown. The frames 102 and 103 are connected to each other by the frames 104 and 105 via screws 110 and 111. Further, a document snnsor SE is disposed above the first document placing area 1a of the tray 1.

The transport means 4 includes a first belt transport portion 3 and a second belt transport portion 2, both of which are arranged in a line in a direction perpendicular to the direction of transport of the document P shown by an arrow a in FIG. 1.

As shown in FIG. 2, a shield member 301 is attached between the first and second belt transport portions 3 and 2 by an attached portion 31 (shown in FIG. 1). The second belt transport portion 2 comprises an endless belt 6, a driving roller 7 for driving the endless belt 6 and a driven roller 8. A rotational driving axis 12 has its one end 12a connected to a motor M3 and supported by the frame 102 through a bearing 13a and another end 12b supported by a bearing 13b which is supported by a support portion not shown in the housing 201. A rotational driving axis 14 has its one end 14a rotatably supported by the frame 102 through a bearing 15a and another end 14b supported by a bearing which is supported by a support portion not shown in the housing 201. The driven roller 8 is attached to the rotational axis 14.

The first belt transport portion 3 includes an endless belt 9, a driving roller 10 for driving the endless belt 9 and a driven roller 11.

The driving roller 10 is supported on a rotational driving axis 16 which has its one end 16a held by the bearing 13b through a spring clutch 17 and a collar 18 with the end 12b of the rotational driving axis 12 made in contact therewith. Another end 16b of the rotational driving axis 16 is supported by the frame 103 through a bearing 13c. The driven roller 11 has its one end 25a supported by the frame 103 through a bearing 26a and another end 25b mounted on a rotational axis 26 which is in contact with the end 14b of the rotational axis 14 by a bearing 15b.

The changeover portion 5 comprises a solenoid 25 accommodated and supported in the right side of the housing 201 in FIG. 2, a lever 29 pivotably connected via a connected portion 27 about a base portion 28 attached to the housing 201 (shown in FIG. 1) and a spring 30 for drawing the lever 29 to the rightward direction in FIG. 1.

Figure 3:
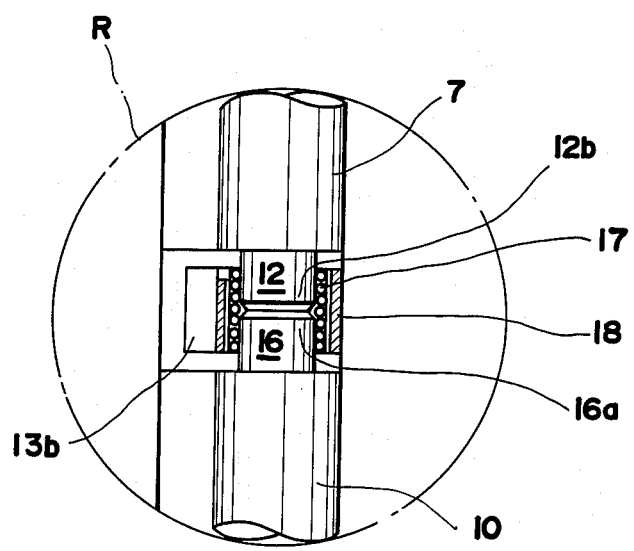
FIG. 3 is an enlarged view of the portion encircled in FIG. 2.

FIG. 3 is a view enlargingly showing a portion of a contact R of the driving rollers 7 and 10 (i.e., the encircled portion in FIG. 2). As shown in FIG. 3, the end 12b of the rotational driving axis 12 and the end 16a of the rotational axis 16 are supported by the bearing 13b through the collar 18. The spring clutch 17, which has an internal diameter smaller than the external diameters of the axes 12 and 16 in a free state, is provided to the ends 12b and 16a so as to tighten the axises 12 and 16 due to the reaction force of the clutch 17. As a result, when the solenoid 25 becomes OFF, in other words, when the lever 29 is drawn at its bottom portion in the rightward direction to be brought to a position shown by a solid line in FIG. 1, the driving force of the motor M3 is transmitted to the end 16a of the axis 16 through the end 12b of the axis 12 and the spring clutch 17, with the result that the axises 12 and 16 can integrally rotate. This means that the copying machine can execute the copying operation in a cooperate mode. On the other hand, upon the actuation of the solenoid, the lever 29 pivots in the clockwise direction against the spring 30 to press the spring clutch 17 in the direction of widening the one end thereof as shown by a two-dot-and-dash line in FIG. 1, so that the driving force of the motor M3 cannot be transmitted to the axis 16 due to the looseness of the spring clutch 17. Therefore, only the second belt transport portion 2 driven by the axises 12 and 14 is activated, while the first belt transport portion comes to a standstill. This means that the copying machine can execute the copying operation in an independent mode.

This embodiment shows that the endless belt is divided into two portions, i.e., the first belt transport portion 3 and the second belt transport portion 2. However, the invention is not limited to this embodiment. Namely, the endless belt may be divided into three or more portions. Further, in place of the spring clutch 17 for breaking off the power for the belt, any other mechanism which can break off the power may be adapted.

Figure 4:
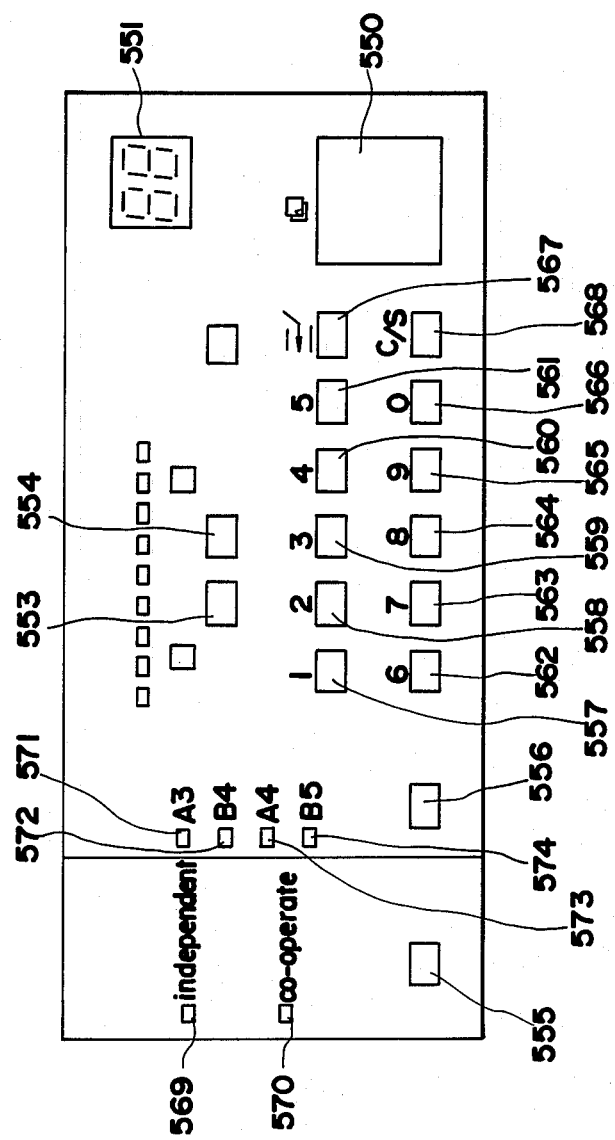
FIG. 4 is a view showing an operational panel.

FIG. 4 illustrates an operational panel of the copying machine. The operational panel includes a print key 550 for starting the copying operation, a numeral indicating device 551, up and down keys 553 and 554 for giving an adjusted image density, a mode changing key 555 for changing over the copy mode, a feed portion selecting key 556, ten keys 557 to 566, an interruption key 567, a clear/stop key 568, copy mode indicators 569 and 570, paper size indicators 571 to 574, and the like.

Figure 5:
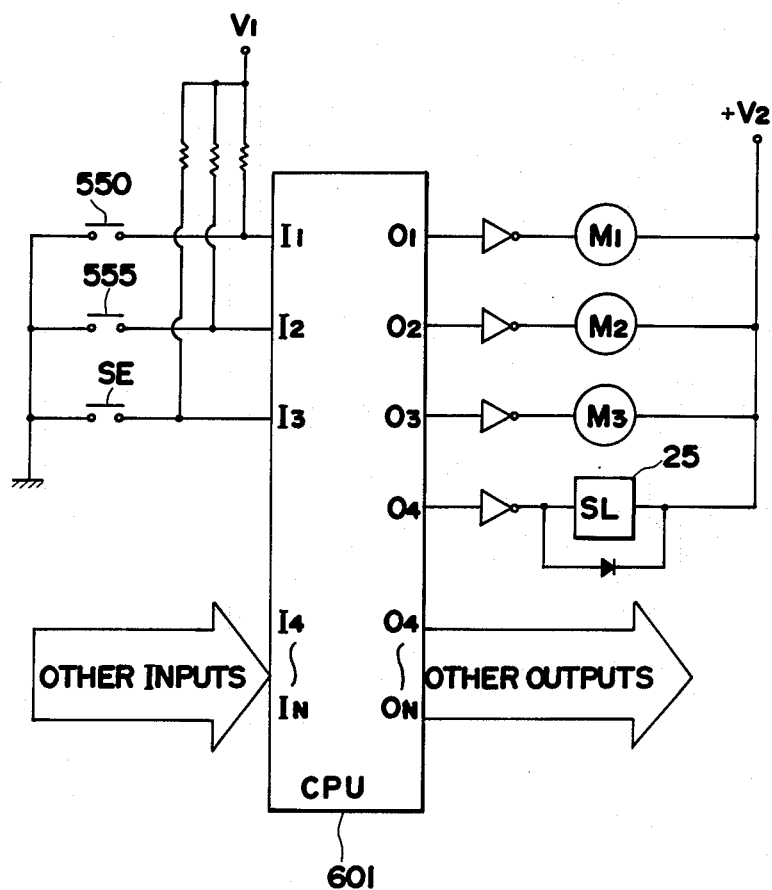
FIG. 5 is a block diagram schematically showing a control circuit.

FIG. 5 is a view illustrating a control circuit of the copying machine. A CPU 601 consists essentially of a microcomputer having connected to its input ports $I_1$ to $I_3$ the print key 550, mode changing key 555 and document sensor SE respectively and to its input ports $I_4$ to $I_N$ various input keys of the panel and sensors. Connected to the output ports $O_1$ to $O_4$ of the CPU 601 are the motors M1, M2, M3 and the solenoid 25 respectively and to the other output ports $O_4$ to $O_N$ are a main motor, developing motor, timing roller clutch, upper and lower paper feed clutches, charger, transfer charger, various indicators 551 and 569 to 574, and the like, said output terminals $O_1$ to ON controlling the ON/OFF status of each component based on the signals from the input terminals $I_1$ to $I_N$.

The operation of the copying machine having the abovementioned structure will be explained hereinafter based on FIGS. 6 to 10. This copying machine is capable of performing a copy operation in either the independent mode wherein two kinds of different documents are set on the document support table 501 to make a copy or the cooperate mode wherein one kind of document is set on the document support table 501 to make a copy. The copy mode is selected by operating the mode changing key 555 on the operational panel.

Independent Mode

Figure 6:
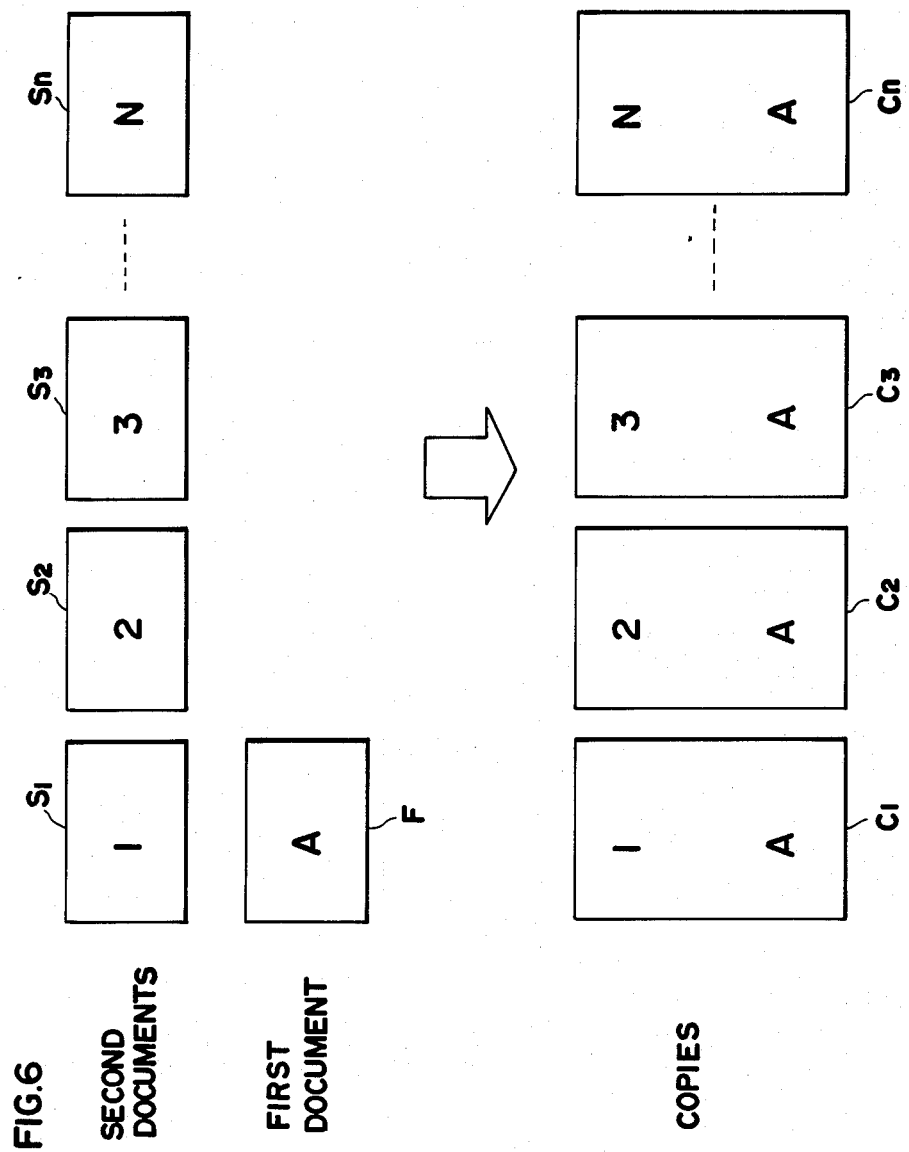
FIG. 6 illustrates documents and copies to be obtained according to a preferred embodiment.

Copies to the number of n, i.e., $C_1$ to $C_n$, can be obtained from a first document F and second documents to the number of n, i.e., $S_1$ to $S_n$ in the independent mode as shown in FIG. 6.

In order to carry out the copy operation in the independent mode, the first document F is set on the first document placing area 1a of the tray 1 and second documents to the number of n are set on the second document placing area 1b. Then, the mode changing key 555 is operated to select the independent mode.

Figure 7:
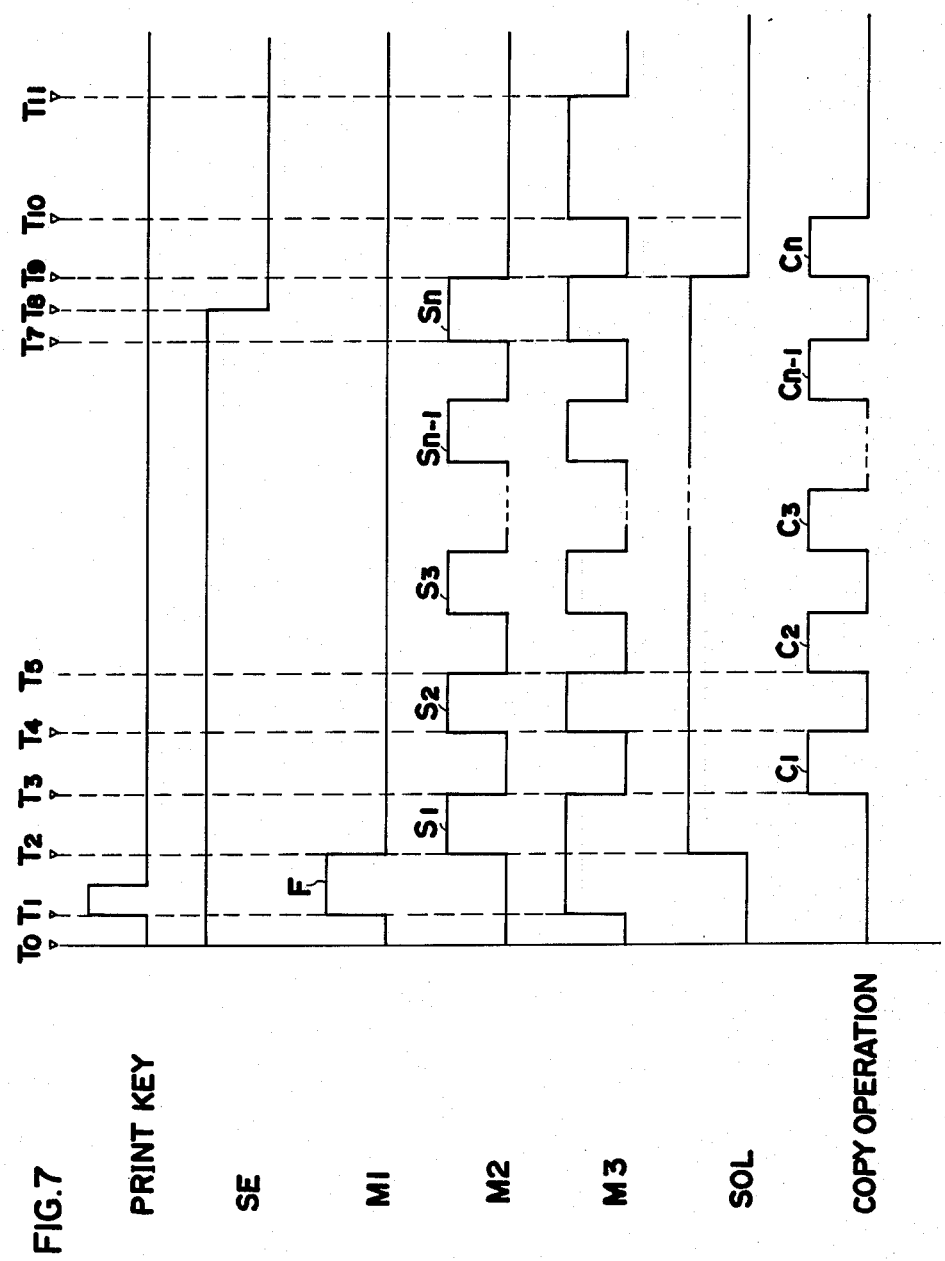
FIG. 7 is a time chart in an independent mode.
Figure 8:
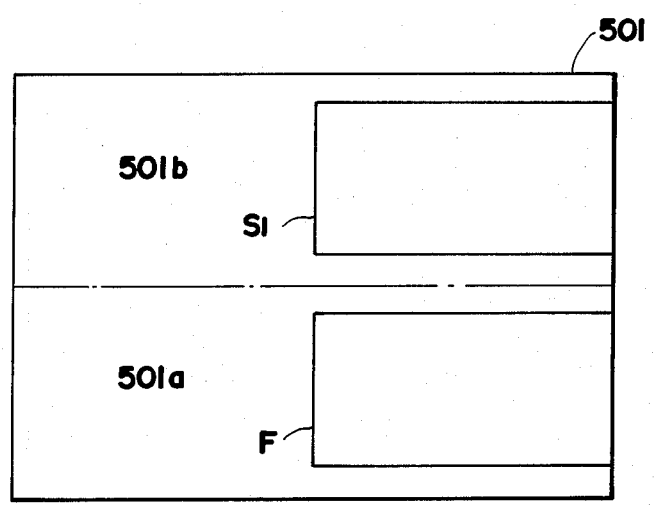
FIG. 8 is a top view of the document support table.

Thereafter, upon the depression of the print key 550, the copy operation is performed in the independent mode as shown in FIG. 7. The detailed procedures follow hereinbelow.

(1) The motors M1 and M3 is driven upon the actuation of the print key 550 at a time $T_1$. At that time, the solenoid 25 is OFF. The feed roller 22 is rotated by the motor M1. Further, the first belt transport portion 3 is driven by the motor M3 since the solenoid 25 is OFF. The operation of the first belt transport portion 3 feeds the first document F placed on the first document placing area 1a of the tray 1 to a first exposure area 501a of the document support table 501.

(2) At a time $T_2$, the actuation of the motor M1 is stopped, the actuation of the motor M2 is started and the solenoid 25 is turned ON. The first belt transport portion 3 is brought to a halt due to the energization of the solenoid 25, resulting in that the first document F is set at a first predetermined position of the first exposure area 501a. Moreover, the motor M2 rotates the feed roller 24, supplying the second document $S_1$ on the second document placing area 1b of the tray 1 to the second exposure area 501b of the document support table 501.

(3) At a time $T_3$, the motors M2 and M3 are terminated, so that the second document $S_1$ is set at a second predetermined position on the document support table 501. Then, the operation is commenced by the machine main body 500 to form a composite copy from the images of the first and second documents F and $S_1$ to obtain the copy $C_1$.

(4) At a time $T_4$, the copy operation to obtain the copy $C_1$ is completed and the motors M2 and M3 are energized. Only the second belt transport portion 2 is driven by the motor M3 since the solenoid 25 is in ON state, therefore, the second document $S_1$ is discharged from the document support table 501. At the same time, the feed roller 24 is driven by the motor M2 to feed the next second document $S_2$ which is placed on the second document placing area 1b of the tray 1 to the document support table 501.

(5) At a time $T_5$, the motors M2 and M3 are terminated, with the result that the second document $S_2$ is set at the second predetermined position on the document support table 501. Then, the operation is commenced by the machine main body 500 to form a composite copy from the images of the first and second documents F and $S_2$ to obtain the copy $C_2$.

(6) The aforesaid operation is repeatedly performed. More specifically, the second documents $S_3$ to $S_{n-1}$ are successively set at the second predetermined position of the document support table 501 to form copies $C_3$ to $C_{n-1}$.

(7) At a time $T_7$, the copy operation to obtain the copy $C_{n-1}$ is completed and the motors M2 and M3 are energized. Only the second belt transport portion 2 is driven by the motor M3 since the solenoid 25 is in ON state, therefore, the second document $S_{n-1}$ is discharged from the document support table 501. At the same time, the feed roller 24 is driven by the motor M2 to feed the nth second document $S_n$, i.e., the last second document $S_n$, which is placed on the second document placing area 1b of the tray 1 to the document support table 501.

(8) At a time $T_8$, the document sensor SE detects that the last second document $S_n$ is fed.

(9) At a time $T_9$, the motors M2 and M3 are terminated, with the result that the last second document $S_n$ is set at the second predetermined position on the document support table 501. Then, the operation is commenced by the machine main body 500 to form a composite copy from the images of the first and second documents F and $S_n$ to obtain the copy $C_n$. The solenoid 25 is turned OFF at the time $T_9$.

(10) At a time $T_{10}$, the copy operation to obtain the copy $C_n$ is completed. The first and second belt transport portions 3 and 2 are simultaneously driven by the motor M3 since the solenoid 25 is in OFF state. Accordingly, the first and second documents F and $S_n$ are discharged from the document support table 501 to the discharge tray 32.

Figure 9:
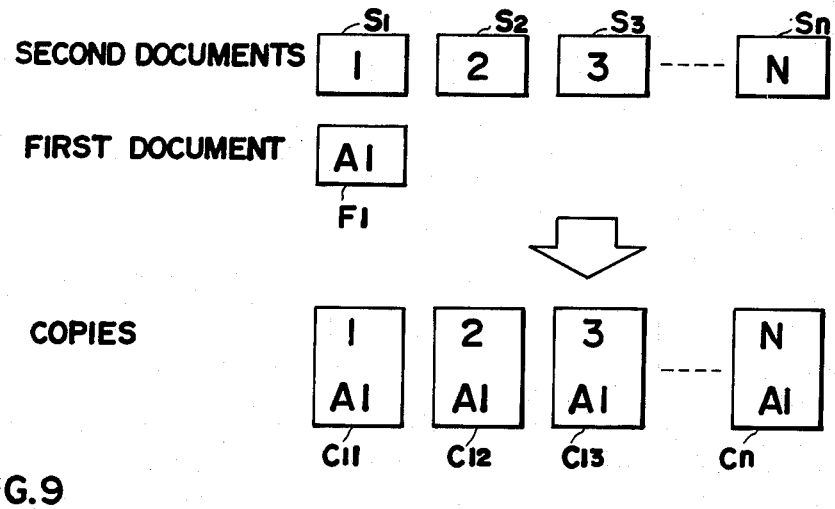
FIG. 9 illustrates documents and copies to be obtained according to another embodiment.
Figure 9:
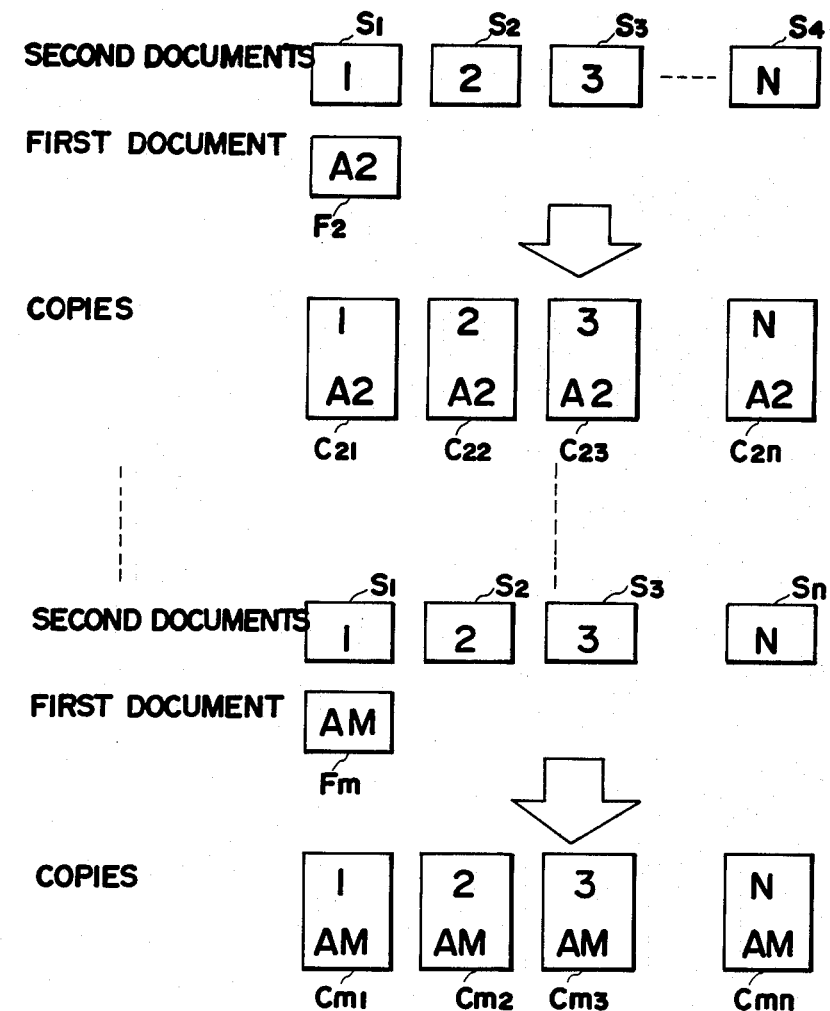

The aforesaid embodiment teaches the process for obtaining the copies to the number of n, i.e., $C_1$ to $C_n$ from the one first document F and the second documents to the number of n, i.e., $S_1$ to $S_n$. Subsequently, we will explain the process for obtaining copies to the number of m x n, i.e., $C_{11}$ to $C_{1n}$, $C_{21}$ to $C_{2n}$ ... $C_{m1}$ to $C_{mn}$ from the first documents to the number of m, i.e., $F_1$ to $F_m$ and the second documents to the number of n, i.e., $S_1$ to $S_n$ as shown in FIG. 9. The specific explanation will follow hereinafter.

(i) At first, the first documents to the number of m, $F_1$ to $F_m$ are set at the first document placing area 1a of the tray 1, while the second documents to the number of n, $S_1$ to $S_n$ at the second document placing area 1b. Upon the depression of the print key 550, copies to the number of n, $C_{11}$ to $C_{1n}$ are obtained by the process described at (1) to (10).

(ii) Next, the second documents discharged to the discharge tray 32 are again set on the second document placing area 1b. When the print key 550 is depressed in this state, copies to the number of n, $C_{21}$ to $C_{2n}$ are obtained by the process described at (1) to (10).

(iii) The process of (ii) is repeatedly performed until there is no first document placed at the first document placing area 1a. Accordingly, copies $C_{31}$ to $C_{3n}$, $C_{41}$ to $C_{4n}$, ... $C_{m1}$ to $C_{mn}$ are obtained.

Cooperate Mode

The operation in the cooperate mode is illustrated at a time chart in FIG. 10. The solenoid 25 is always deenergized during the cooperate mode, with the result that the first and second belt transport portions 3 and 2 are always driven in integral relation with each other or stopped. Moreover, the motors M1 and M2 are energized or deenergized at the same timing. Specifically, in the cooperate mode, the documents placed on the tray 1 are set one by one at the document support table 501 to carry out the copy operation. Thereafter, the copied document on the document support table 501 is discharged onto the discharge tray 32, while the next document is set on the document support table 501 from the tray 1. A further explanation is omitted since the operation in the cooperate mode is the same as that of the conventional copying machine.

Although the aforesaid embodiment teaches that the first and second belt transport portions 3 and 2 are integrally driven by the same motor M3, the first belt transport portion 3 may exclusively be provided with a motor M4 in order to drive the first belt transport portion 3 independently of the second belt transport portion 2.

In addition to the examples of use explained above, the document feeding apparatus of the present invention can be of wide application. For example, the feeding apparatus can be used for incorporating or rearranging several different information into the same copy.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A document feeding apparatus wherein a document is fed to a platen of a copying machine and discharged from the platen after exposure, said apparatus comprising:
   document stack means including a first stack portion and a second stack portion;
   first supply means for feeding a document placed on the first stack portion to the platen;
   first transport means for setting the document fed by the first supply means on a first area of the platen and then discharging the same therefrom after exposure;
   second supply means for feeding a document placed on the second stack portion to the platen, said second supply means being independently operable of the first supply means; and
   second transport means for setting the document fed by the second supply means on a second area of the platen and then discharging the same therefrom after exposure, said second transport means being independently operable of the first transport means.

2. A document feeding apparatus as claimed in claim 1 wherein the first and second supply means are integrally operable, and the first and second transport means are integrally operable.

3. A document feeding apparatus as claimed in claim 2 further comprises:
   mode selecting means for selecting either a first mode or a second mode; and
   control means for operating the second supply means and second transport means independently of the first supply means and second transport means respectively in the first mode and for integrally operating the first and second supply means as well as for integrally operating the first and second transport means in the second mode.

4. An automatic document feeding apparatus for feeding a document to a platen of a copying machine comprising:
   document placing means including a first document placing area and a second document placing area and capable of simultaneously placing a different document on each document placing area;
   first feeding means for feeding a document placed on the first document placing area to a first area of the platen; and
   second feeding means for feeding a document placed on the second document placing area to a second area of the platen; said second feeding means being independently operable of the first feeding means.

5. An automatic document feeding apparatus as claimed in claim 4 wherein the first and second feeding means are integrally operable.

6. An automatic document feeding apparatus as claimed in claim 5 further comprises:
   mode selecting means for selecting either a first mode or a second mode; and
   control means for operating the second feeding means independently of the first feeding means in the first mode and for integrally operating the first and second feeding means in the second mode.

7. A copying machine comprising:
   a platen including a first document placing area and a second document placing area;
   document stack means including a first stack portion and a second stack portion;
   first supply means for feeding a document placed on the first stack portion to the platen;
   first transport means for setting the document fed by the first supply means on a first area of the platen and then discharging the same therefrom after exposure;
   second supply means for feeding a document placed on the second stack portion to the platen, said second supply means being independently operable of the first supply means; and
   second transport means for setting the document fed by the second supply means on a second area of the platen and then discharging the same therefrom after exposure, said second transport means being independently operable of the first transport means; and
   copying means for copying the documents on the first and second document placing areas to the same copy paper.

8. A copying machine as claimed in claim 7 wherein the copying means starts the copy operation when the documents are set on both the first and second areas of the platen.

9. A copying machine as claimed in claim 8 further comprising:
   detecting means for detecting the document in the second stack portion; and
   control means for controlling the first supply means and the first transport means so as not to be driven and the second supply means and the second transport means so as to be driven when the detecting means detects the document after completion of the copy operation.

10. A copying machine as claimed in claim 9 wherein the control means integrally operates the first and second transport means when the detecting means detects the absence of the document after completion of the copy operation.

* * * * *